(12) United States Patent
Ly

(10) Patent No.: US 7,281,040 B1
(45) Date of Patent: Oct. 9, 2007

(54) DIAGNOSTIC/REMOTE MONITORING BY EMAIL

(75) Inventor: John Dung-Quang Ly, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/520,687

(22) Filed: Mar. 7, 2000

(51) Int. Cl.
G06F 15/173 (2006.01)

(52) U.S. Cl. .................. 709/224; 709/206; 709/207; 709/220; 709/318; 710/15; 714/38; 714/47; 714/48; 714/51

(58) Field of Classification Search ............... 709/223, 709/224, 318, 206, 207, 220; 710/15; 714/38, 714/47, 48, 51
See application file for complete search history.

(56) References Cited

U.S. PATENT DOCUMENTS

| | | | | |
|---|---|---|---|---|
| 3,925,764 | A * | 12/1975 | Wiesenewsky | 340/825.26 |
| 4,769,761 | A * | 9/1988 | Downes et al. | |
| 4,905,196 | A * | 2/1990 | Kirrmann | 365/200 |
| 5,555,191 | A * | 9/1996 | Hripcsak | 709/224 |
| 5,657,257 | A * | 8/1997 | Lee | 713/321 |
| 5,838,683 | A | 11/1998 | Corley et al. | 370/408 |
| 5,864,542 | A | 1/1999 | Gupta et al. | 370/257 |
| 5,867,666 | A | 2/1999 | Harvey | 395/200.68 |
| 6,003,078 | A * | 12/1999 | Kodimer et al. | |
| 6,070,190 | A * | 5/2000 | Reps et al. | 709/224 |
| 6,085,244 | A * | 7/2000 | Wookey | 709/224 |
| 6,098,101 | A * | 8/2000 | Sears | 709/224 |
| 6,144,987 | A | 11/2000 | Niemi | |
| 6,244,758 | B1 * | 6/2001 | Solymar et al. | 709/224 |
| 6,389,464 | B1 * | 5/2002 | Krishnamurthy et al. | 709/220 |
| 6,397,359 | B1 * | 5/2002 | Chandra et al. | 714/712 |
| 6,449,739 | B1 * | 9/2002 | Landan | 714/47 |
| 6,470,386 | B1 * | 10/2002 | Combar et al. | |
| 6,477,667 | B1 * | 11/2002 | Levi et al. | |
| 6,499,114 | B1 * | 12/2002 | Almstead et al. | 714/25 |
| 6,526,442 | B1 * | 2/2003 | Stupek et al. | 709/224 |
| 6,553,416 | B1 * | 4/2003 | Chari et al. | 709/224 |
| 6,868,445 | B1 * | 3/2005 | Chebrolu | 709/224 |
| 6,970,924 | B1 * | 11/2005 | Chu et al. | 709/224 |

(Continued)

FOREIGN PATENT DOCUMENTS

WO   WO97/18665   5/1997

OTHER PUBLICATIONS

"TMN-Based Broadband ATM Network Management," Fowler, Henry J., IEEE Communications Magazine, Mar. 1995, pp. 74-79.

(Continued)

*Primary Examiner*—Michael Won
(74) *Attorney, Agent, or Firm*—Stolowitz Ford Cowger LLP

(57) ABSTRACT

A network device for use in a communication system having a technical support center operated by a technical support staff, the technical support center being in communication with the network device through a packet switching network. The network device includes one or more hardware subsystems, one or more software subsystems and means for monitoring the status of the hardware and software subsystems so that when a problem occurs with respect to one or more of the hardware and software subsystems of the network device, the network device for transmitting a first message to the technical support center to notify the technical support center of the problem, wherein the technical support staff is able to diagnose the problem without interruption to the operation of the network device.

9 Claims, 7 Drawing Sheets

U.S. PATENT DOCUMENTS

| | | | |
|---|---|---|---|
| 7,010,594 B2* | 3/2006 | Defosse | 709/224 |
| 7,047,293 B2* | 5/2006 | Motoyama et al. | 709/224 |
| 7,167,912 B1* | 1/2007 | Dhingra | 709/223 |

OTHER PUBLICATIONS

"A Scaleable, Platform-Based Architecture for Multiple Domain Network Management," Stamatelopoulos, F. Chiotis, T., Maglaris, B., NETwork Management and Optimal DEsign (NETMODE) Group, Department of Electrical and Computer Engineering, National Technical University of Athens, IEEE, 0-7803-2486-2/95, pp. 1453-1458.

"Integrated Network Management: Technologies and Implementation Experience," Rabie, S., Bell-Northern Research, Ottawa, Ontario K1Y 4H7, Canada, INFOCOM '92, CH3133-6/92/0000-1020, 1992, pp. 1020-1027.

"Development of an Integrated Network Manager for Heterogeneous Networks Using OSI Standards and Object-Oriented Techniques," Stratman, Robert H., IEEE Journal on Selected Areas in Communications, vol. 12, No. 6 Aug. 1994, pp. 1110-1120.

"Dynamic Operation and Maintenance Systems for Switching Networks," Miyasaki, T., Kim Moo W., Wakamoto, M. IEEE Communications Magazine, Sep. 1990, pp. 34-39.

"Enterprise Network Management: LAN Status Monitoring," Choi, T. and Tang, A. OSE Laboratory, Computer Science and Telecommunications Program, University of Missouri-Kansas City, 4747 Troost Avenue, Kansas City MO, IEEE 0-7803-2486-2/95, pp. 1448-1452.

"ATM Transport Network Operation System in Japan," Fujii, N. and Yamamura, T., NTT Optical Network Systems Laboratories, IEEE Communications Magazine, Sep. 1996, pp. 70-75.

* cited by examiner

Key To
FIG. 4

| FIG. 4a |
| FIG. 4b |

FIG. 4a

```
 1  Bug CSCdp64343                                        CSC.sys              Enclosure 4 of 10
 2                                                        all                  Added 000107 by hanif
 3  rommon 7 > stack
 4  Kernel Level Stack Trace:
 5  Initial SP = 0x616cbd48, Initial PC = 0x602dce94, RA = 0x602c92e4
 6  Frame 0 : FP= 0x616cbd48,     PC= 0x602dce94,        0 bytes
 7  Frame 1 : FP= 0x616cbd48,     PC= 0x602c92e4,       24 bytes
 8  Frame 2 : FP= 0x616cbd60,     PC= 0x602d8fd8,       40 bytes
 9  Frame 3 : FP= 0x616cbd88,     PC= 0x602d91b8,      200 bytes
10  Frame 4 : FP= 0x616cbe50,     PC= 0x602d87f8,       40 bytes
11  Frame 5 : FP= 0x616cbe78,     PC= 0x602b68c0,      168 bytes
12  Frame 6 : FP= 0x616cbf20,     PC= 0x602b5aec,       32 bytes
13  Frame 7 : FP= 0x616cbf40,     PC= 0x602db848,       88 bytes
14  Process Level Stack Trace:
15  Initial SP = 0x630fac40, Initial PC = 0x603f6080, RA = 0x603f608c
16  Frame 0 : FP= 0x630fac40,     PC= 0x603f6080,       56 bytes
17  Frame 1 : FP=0x630fac78,      PC= 0x603f608c,       72 bytes
18  Frame 2 : FP= 0x630facc0,     PC= 0x602b39e4,       24 bytes
19  Frame 3 : FP= 0x630facd8,     PC= 0x602b39d0,       24 bytes
```

```
61  t6  : 00000000  01000000   | s8    : 00000000  00000000
62  t7  : 01000100  0000000f   | ra    : 00000000  6037608c
63  HI  : 00000000  00000000   | LO    : 00000000  00000000
64  EPC : 00000000  603g6080   | ErrPC : 00000000  602dc060
65  Stat : 3400ff03            | Cause : 01000010
66  Interrupt Control Register          : 10001f82

67  rommon 9 >

68  hanif@life:NONE:symbols[84] rsym c5400-js-mz.symbols.Jan7
69  Reading c5400-js-mz.symbols.Jan7
70  c5400-js-mz.symbols.Jan7 read in
71  Enter hex value: 603F6080 603F068C 602B39E4 602B39D0
72  0x603F6080:cdp_cache_ager(0x603f03f4)+0x54
73  0x603F068C:cdp_prot(0x603f03f4)+0x298
74  0x602B39E4:r4k_process_dispatch(0x602b39d0)0x14
75  0x602B39D0:r4k_process_dispatch(0x602b39d0)+0x0
76  Enter hex value:
77  Enter hex value:
78  Enter hex value:
79  Enter hex value: 0x602dce94
```

FIG. 4b

```
20  rommon 8 > context
21  Kernel Level Context:
22  Reg     MSW         LSW
23  ─────────────────────────────
24  zero  : 00000000    00000000
25  AT    : 00000000    61730000
26  v0    : 00000000    0000000a
27  v1    : 00000000    00000010
28  a0    : 00000000    0000002b
29  a1    : 00000000    0000000a
30  a2    : 00000000    00000010
31  a3    : 00000000    618dd470
32  t0    : 00000000    00000038
33  t1    : 00000000    34000001
34  t2    : 00000000    10001082
35  t3    : ffffffff    fffc00ff
36  t4    : 00000000    00001000
37  t5    : 00000000    0000001c
38  t6    : ffffffff    fffc0ff
39  t7    : 00000000    00000002
40  HI    : 00000000    00000006
41  EPC   : 00000000    602dce94
42  Stat  : 34000002
43  Interrupt Control Register 44  Process Level Context:
45  Reg     MSW         LSW
46  ─────────────────────────────
47  zero  : 00000000    00000000
48  AT    : 00000000    618e0000
49  v0    : 00000000    00000000
50  v1    : 00000000    0be6d67d
51  a0    : 00000000    00000000
52  a1    : 00000000    01263690
53  a2    : 00000000    00000000
54  a3    : 00000000    00000000
55  t0    : 00000000    00000000
56  t1    : 00000000    00000003
57  t2    : 00000000    00000001
58  t3    : ffffffff    fffc0ff
59  t4    : 00000000    00001f00
60  t5    : 00000000    0000f36d
```

```
    Reg     MSW         LSW
    ─────────────────────────────
    s0    : 00000000    34000001
    s1    : 00000000    00000001
    s2    : 00000000    0000000a
    s3    : 00000000    00000010
    s4    : 00000000    618dd470
    s5    : 00000000    61250000
    s6    : 00000000    618f0000
    s7    : 00000000    618e8e20
    t8    : 00000000    0000990d
    t9    : 00000000    00000000
    k0    : 00000000    618dd470
    k1    : 00000000    00000000
    gp    : 00000000    6173ecc0
    sp    : 00000000    616cbd48
    s8    : 00000000    00000000
    ra    : 00000000    602c92e4
    LO    : 00000000    00000000
  ErrPC   : 00000000    602dc060
  Cause   : 10001082

Reg     MSW         LSW
    ─────────────────────────────
    s0    : 00000000    0d0d0d0d    ← 60
    s1    : 00000000    0d0d0d0d
    s2    : 00000000    64bd06ec
    s3    : 00000000    618e8b78
    s4    : 00000000    618e8b78
    s5    : 00000000    61250000
    s6    : 00000000    618f0000
    s7    : 00000000    618e8e20
    t8    : 00000000    602d9ff4
    t9    : 00000000    00000000
    k0    : 00000000    30400c01
    k1    : 00000000    01000000
    gp    : 00000000    6173ecc0
    sp    : 00000000    630fac40
```

```
80   0x602dce94 : emt_call (0x602dce90) +0x4
81   Enter hex value: 0x602dce94
82   0x602dce94: emt_call (0x602dce90) +0x4
83   Enter hex value: 0x602c92e4
84   0x602c92e4 : mon_cpu_exception(0x602c92c0)+0x24
85   Enter hex value: 0x602d8fd8
86   0x602d8fd8: r4k_return_to_monitor_direct(0x602d8f60)+0x78
87   Enter hex value: 0x602d91b8
88   0x602d91b8: r4k_return_to_monitor(0x602d9010)+0x1a8
89   Enter hex value: 0x602d87f8
90   0x602d87f8:handle_exception (0x602d84d0)+0x328
91   Enter hex value: 0x602b68c0
92   0x602b68c0: special_default (0x602b66a4) +0x21c
93   Enter hex value: 0x602b5aec
94   0x602b5aec:r4k_signal_handler(0x602b59a8) + 0x144
95   Enter hex value: 0x602db848
96   0x602db848: r4k_sig_dispatch_return(0x602db848) +0x0
97   Enter hex value: 0x603f6080
98   0x603f6080: cdp_cache_ager(0x603f602c) +0x54
99   Enter hex value: 0x603f068c,
100  0x603f068c, :cdp_prot (0x603f03f4) +0x298
101  Enter hex value: 0x602b39e4
102  0x602b39e4 : r4k_process_dispatch (0x602b39d0) +0x14
103  Enter hex value: 0x602b39d0
104  0x602b39d0 : r4k_process_dispatch (0x602b39d0) +0x0
105  Enter hex value:
```

DIAGNOSTIC/REMOTE MONITORING BY EMAIL

BACKGROUND OF THE INVENTION

1. Field of the Invention

The present invention relates generally to a method and apparatus for detecting a problem with a network device employed in a communication system and particularly to a method and apparatus for detecting a hardware or software-related problem within one or more network device among a large number of operational network devices within the communication system.

2. Description of the Prior Art

In modern communication systems, there may be a large number of network devices such as mail servers, routers and computers present within a system. Under such circumstances, it is common to have equipment failure, which would then require diagnostic evaluation and debugging. If the system includes hundreds of routers, such as in Cisco Systems Inc. laboratories, in order to identify the router that has failed, an engineer located at a technical support center must establish at least limited communication with every one of the routers (referred to as logging into the routers), of the large number of routers, in order to try to narrow the problem to one or more specific routers prior to diagnosis of the problem. This is commonly a considerably time-consuming and rigorous process. In fact, currently, among tens and hundreds of routers in operation, it is not unusual for engineers to spend one month in detecting a problem with a specific router.

Currently, when a component within a router fails, the router generates error messages for notification of the failure.

There are several ways in which a network communication system may fail. Among these are problems arising in the hardware and software components of various devices and communication lines and interfaces connecting the various devices of the communication system together. When there is a hardware problem, such as the failure of a board in one of the devices due to overheating, the driver in the device detects the problem by receiving an error message from the board thereby alerting the software that is being executed in the device of the device's failure. However, when the system fails, the valuable information regarding the reason for failure, which may be embedded in an error message in the software, may be lost, making the task of diagnosing the cause of failure more difficult and time-consuming by erasing any potential clues which might otherwise help an engineer in diagnosing the problem.

By way of execution of the software in a device, relevant information regarding the failure of the device exists but it is not necessarily communicated to the technical support staff after the device has failed. When the device, which might be a computer or an access server (router), is powered down and then powered back on, the original problem may disappear during rebooting or the conditions, which caused the problem, may no longer exist. Such is the case when a board malfunctions due to overheating and resumes functioning properly once it is cooled. Similarly, an existing problem may not recur immediately after the device is rebooted and may resurface at a later time making the task of troubleshooting (or debugging) more difficult.

Before the occurrence of the failure of the device, the operating system residing and being executed in the device or the software being executed on the device has the most current information regarding the status of various components in the device. Currently, such information is not communicated to the technical support center and remains isolated within the device. The engineers located at a technical support center, based on the status of the device immediately before its failure, could draw valuable insights into the mechanisms of failure and suggest ways of remedying the problem.

If the device is a computer, the operating system or the software within the computer has current information regarding the status of the modem, software updates, status of the hard drive and every other hardware and software subcomponent within the computer. If such information were available to the technical support center, troubleshooting the device could be performed much more efficiently and cost effectively. In addition, since the time duration in which the system is out of service is shortened, the customers making use of the system experience less delay, resulting in a higher degree of customer satisfaction.

Therefore it is desirable to devise a system and method for monitoring the status of a network device at all times and for reporting any problems that may arise in the hardware, software or the interface components of the device to a technical support center so as to rapidly detect a problem with one or more network devices within a large group of network devices. Additionally, the need arises for the monitoring system and method to include the capability to process instructions from the technical support center in order to execute diagnostic tests on the hardware components or request more detailed information from the software subsystems included within the device.

SUMMARY OF THE INVENTION

Briefly, in an embodiment of the present invention, a network device is disclosed for use in a communication system having a technical support center operated by a technical support staff, the technical support center being in communication with the network device through a packet switching network. The network device includes one or more hardware subsystems, one or more software subsystems and means for monitoring the status of the hardware and software subsystems so that when a problem occurs with respect to one or more of the hardware and software subsystems of the network device, the network device for transmitting a first message to the technical support center to notify the technical support center of the problem, wherein the technical support staff is able to diagnose the problem without interruption to the operation of the network device.

The foregoing and other objects, features and advantages of the present invention will be apparent from the following detailed description of the preferred embodiments which make reference to several figures of the drawing.

IN THE DRAWING

FIG. 4 depicts an example of a computer register carrying an error message due to hardware or software failure.

DETAILED DESCRIPTION OF THE PREFERRED EMBODIMENTS

Figure 1:
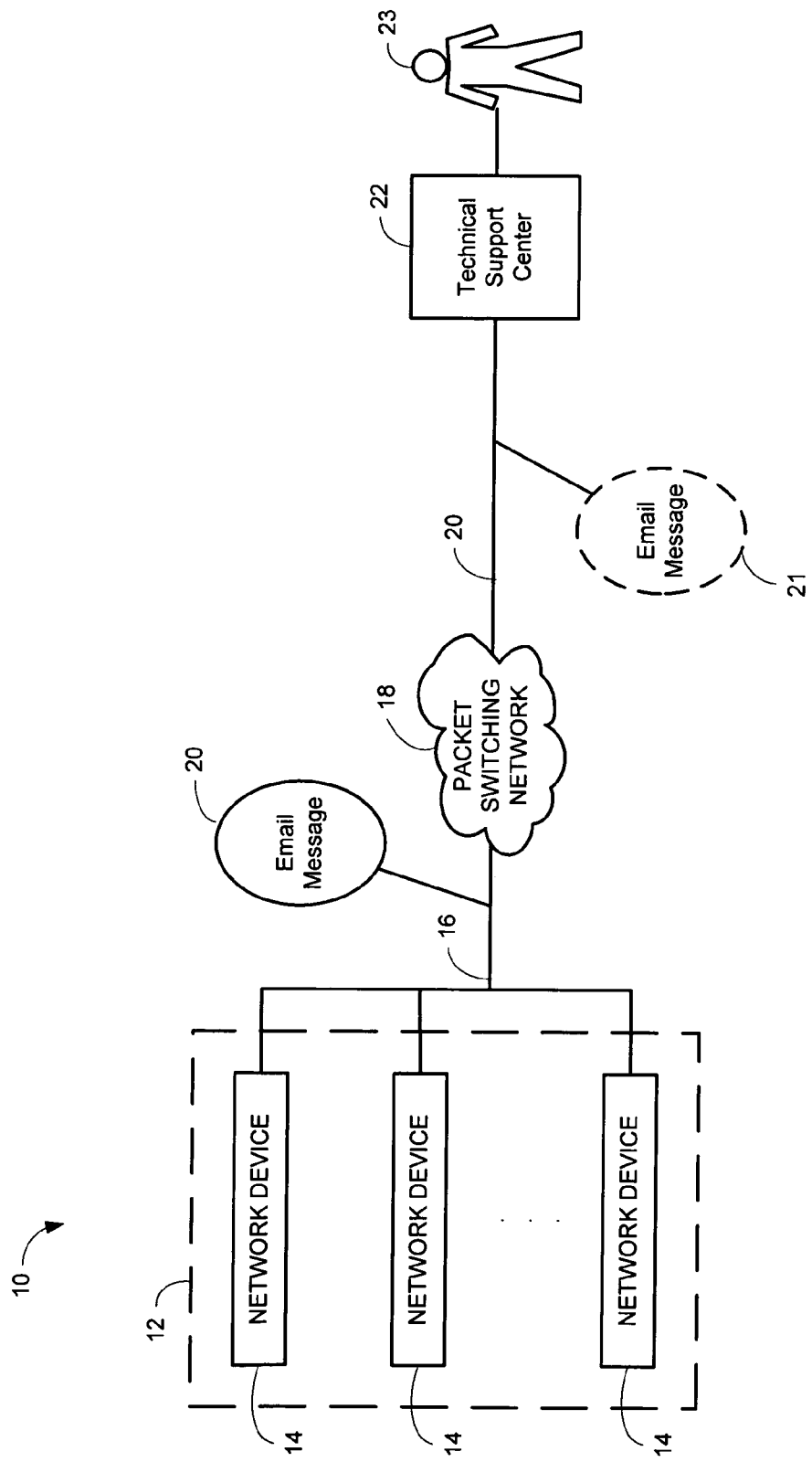
FIG. 1 shows a high-level block diagram of a communications system with the network device assembly and technical support center.

Referring now to FIG. 1, a communication system 10 is shown to include a network device assembly 12, a packet switching network 18 and a technical support center 22 for use by technical support staff 23 in accordance with an embodiment of the present invention. The network device assembly 12 comprises numerous network devices 14, which may be various types of network devices such as network access servers, routers, computer, etc. The network device assembly 12 may include a large number of network devices. A typical application includes hundreds of routers, each of which is an AS5800 model manufactured by Cisco Systems, Inc. of San Jose, Calif.

In one embodiment of the present invention, the packet switching network 18 may be an Internet Protocol (IP) network, such as the Internet. The technical support center 22 is a center equipped with computers and diagnostic equipment typically located at a laboratory site.

Each of the network devices 14 is coupled to the packet switching network 18 through an interface line 16. The packet switching network 1-8 is coupled to the technical support center 22 through an interface line 20. According to one embodiment of the present invention, there are two sets of software programs. The first set of software programs, which will be referred to as the embedded software throughout this document, resides in each of the network devices 14 which may be a router or a computer or any other network device used by a client (or user). The second set of software programs, referred to as the central process software throughout this document, resides in the technical support center 22.

Each of the network devices 14 is in communication with the technical support center 22 through the packet switching network 18. When there are a large number of network devices within the assembly 12, it is likely that a network device may fail due to a hardware or software-related problem.

According to one embodiment of the present invention as shown in FIG. 1, the embedded software resides in every network device 14. The embedded software monitors the status of every hardware component and every software subsystem of the network device 14 by collecting and analyzing data received from the hardware components and software subsystems thereof. When a problem with either a software or a hardware component of the network device 14 is detected by the embedded software, the embedded software notifies the technical support center 22 regarding the problem by transmitting an email message 20, through the interface 16, thereto. Each network device 14 includes the embedded software, accordingly, the technical support center 22 is notified of any problem that may arise within the network device assembly 12.

Alternatively, the network device assembly 12 comprises a number of computers each of which is connected to the technical support center 22 through the network 18. According to an embodiment of the present invention as shown in FIG. 1, the embedded software resides in each of the computers in the network device assembly 12 and monitors the status of various components and processes of the computer such as modems, software updates, hard drive, memory, and the like. When a problem within any hardware component or software subsystem of the computer develops, whether the problem leads to the failure of the computer or not, the embedded software detects the problem and notifies the technical support center 22 by sending an email message, such as the message 20, to the technical support center 22.

The technical support center 22 behaves essentially as an email server with a large database for storing email messages. In addition and as will be discussed in further detail relative to other figures of this patent document, the technical support center 22 carries the central process software, which facilitates communications between the network device 14 and the technical support center 22. In particular, when a problem in the network device 14 is reported to the technical support center 22, the technical support staff 23, i.e. engineers, at the technical support center 22 may need more information to determine the cause of the problem than what is initially conveyed to them in the email message that was sent from one or more of the network devices 14 to the technical support center 22. Thus, in one embodiment of the present invention, using the central process software, the technical support staff 23 send an email message 21 back to the network device 14 requesting more information regarding the problem. The email message 21 is optional in that no further information regarding the problem may be needed and/or solicited.

In the case where detail information regarding the problem is requested, as an example, the email message 20 transmitted to the technical support center 22 may only indicate that a board in a hardware component of the network device 14 is experiencing a problem. The technical support center 22 may require additional diagnostic tests to be performed on the problematic board prior to determining the cause of the problem. Using the central process software, the technical staff 23 at the technical support center 22 perform diagnostic tests on the defective board through the embedded software of the network device 14. To elaborate, if the network device 14 is a computer, the user continues to interact with the computer without any interruption while the diagnostic tests are being performed in the background by the computer. This clearly offers considerable advantage to the user.

Accordingly, the use of the embedded software and the central process software facilitate communications between the network assembly 12 and the technical support center 22 for diagnostics and remote monitoring of each of the plurality of network devices 14. In accordance with another embodiment of the present invention, the technical support center 22 does not include the central process software and only the embedded software is used in each of the network devices 14 in order to monitor the status of the latter and report any problems associated therewith to the technical support center 22. Under such circumstances, the email message 21 is not sent and consequently not as much information can be requested from the embedded software by the technical support center 22 as is the case when the latter includes the central process software. Accordingly, less detailed information is available to the technical support center 22 for diagnostic purposes; nevertheless it is possible to perform diagnostic and remote monitoring of each of the network device 14.

Figure 2:
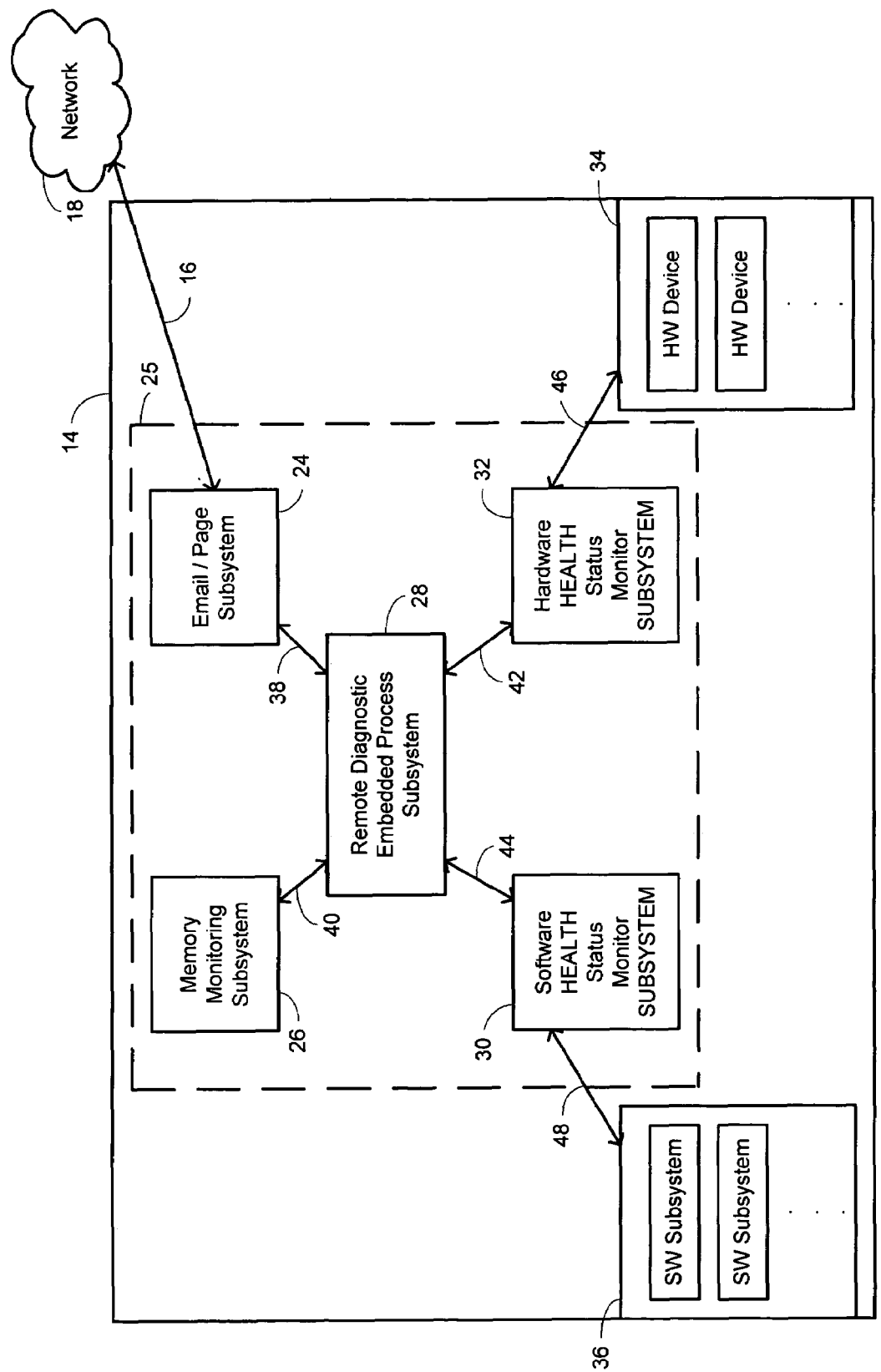
FIG. 2 depicts a high-level block diagram of a network device including embedded software.

Referring now to FIG. 2, one of the network devices 14 of FIG. 1 is shown to be coupled to the network 18 through the interface 16 according to an embodiment of the present invention. The embedded software 25 is shown, in FIG. 2, to reside within the network device 14. The embedded software comprises several software subsystems, i.e. a memory monitoring subsystem 26, an email/page subsystem 24, a remote diagnostic embedded process subsystem 28, a software health status monitor subsystem 30 and a hardware health status monitor subsystem 32. In addition, the network device 14 includes a plurality of other software subsystems 36 and a plurality of hardware devices 34. Examples of the other software subsystems 36 are the Netscape browser application program, Microsoft Excel application program, and the like. Examples of hardware devices 34 are a graphics display board, a hard drive, a modem, and the like.

The remote diagnostic embedded process subsystem 28 is in communication with the other components of the embedded software subsystems. More specifically, the remote diagnostic embedded process subsystem 28 is in communication with the memory monitoring subsystem 26, the email/page subsystem 24, the hardware health status monitor subsystem 32 and the software health status monitor subsystem 30 through the software interfaces 40, 38, 42 and 44, respectively. Moreover, the software health status monitor subsystem 30 is coupled to the other software subsystems 36 through the software interface 48 and the hardware health status monitor subsystem 32 is coupled to the hardware devices 34 through the software interface 46.

The hardware health status monitor subsystem 32 monitors the status of the hardware devices 34 within the network device 14 and communicates such status information to the remote diagnostic embedded process subsystem 28. The hardware health status monitor system 32 further performs background diagnostic tests on the hardware devices 34 as requested by the technical support center 22 (shown in FIG. 1). The software health status monitor subsystem 30 monitors the status of the software subsystems 36 within the network device 14 and communicates such status information to the remote diagnostic embedded process subsystem 28.

The remote diagnostic embedded process subsystem 28 is the main software subsystem of the embedded software. It is used to collect and analyze all of the information provided by the software health status monitor subsystem 30 and the hardware health status monitor subsystem 32. During analysis of the status information, the remote diagnostic embedded process subsystem 28 detects problems encountered by the other software subsystems 36 or the hardware devices 34 resident within the network device 14. In the event a problem develops within any of the software subsystems or hardware devices of the network device 14, the remote diagnostic embedded process subsystem 28 alerts the technical support center 22 by sending information regarding the software or hardware problem thereto.

Transmittal of information from the remote diagnostic embedded process subsystem 28 to the technical support center 22 is accomplished through the email/page subsystem 24. The latter constructs an email message (such as the email message 21 in FIG. 1) incorporating the information received from the remote diagnostic embedded process subsystem 28 through the software interface 38 and transmits the email message, through the network 18, to the technical support center 22 (shown in FIG. 1). The email/page subsystem 24 can alternatively send an email or a facsimile message or alternatively page a user of the network device 14 in order to alert the user of the problem.

As an example, if the network device 14 is a computer whose Internet connection fails, the user has no way of knowing initially whether the Internet line or some component of the modem board has failed. In FIG. 2, the modem board would be one of the devices in the hardware devices 34. The remote diagnostic embedded process subsystem 28 will know of the status of the modem board immediately before the failure of the Internet connection and thus will transmit this information to the technical support center 22. The engineers at the technical support center 22 then detect the problem(s) associated with the modem board based upon status information regarding the modem board, which would have been received by the remote diagnostic embedded process subsystem 28 immediately before the connection failure.

If there are no problems with the modem board, a determination is made as to the failure of the Internet line to be properly connected. In this case, information regarding the failed Internet line is sent to memory, such as non-volatile random access memory (NVRAM) or flash memory for subsequent retrieval thereof by the network device when the latter is again operational. Alternatively, an alarm, in the form of a light indicator or otherwise, is set by the network device indicating a problem with the latter. On the other hand, if the problem emanates from the modem board, the technical support center 22 may decide to perform diagnostic tests on the board, in which case the center 22 will instruct the remote diagnostic embedded process 28 as to how to perform the diagnostic tests.

Memory monitoring subsystem 26 is another software subsystem of the embedded software for monitoring the memory of the network device 14. In the case where the network device 14 is a computer, the memory monitoring subsystem 26 determines if the present memory offers adequate capacity for proper performance of the computer or if the memory is in need of upgrading. In addition, the memory monitoring subsystem 26 checks for memory leaks and memory corruption. Memory leaks occur when memory that is assigned for the performance of tasks becomes less and less over time resulting in at least the appearance of insufficient memory capacity and memory corruption is defective areas of the memory, which may result in insufficient memory capacity. If the user is working with a large program requiring more memory than is available in the computer, the memory monitoring subsystem 26 notifies the remote diagnostic embedded process subsystem 28 accordingly. The subsystem 28, in turn, notifies the user, through the email/page subsystem 24, regarding the inadequacy of the current memory capacity of the computer.

According to one embodiment of the present invention, the technical support center 22 instructs the remote diagnostic embedded process 28 as to how to detect a potential problem. For instance, referring to our previous example, the engineers at the technical support center 22, i.e. technical support staff 23 in FIG. 1, may decide that interruption of the communication line 16 more than five times in an hour presents a potential problem and warrants special attention. Accordingly, the technical support center 22 configures the remote diagnostic embedded process subsystem 28 through email to detect a problem and to notify the center 22 of the same if and when the communication line is interrupted more than five times in an hour.

In FIG. 2, while not shown, the network device 14 includes a processor such as a central processor unit (CPU) (or computer medium) and a storage area, a computer readable medium, for storing software programs for carrying out the various functions discussed herein. The processor executes code from the computer readable medium for effectuating the functions discussed herein.

Figure 3:
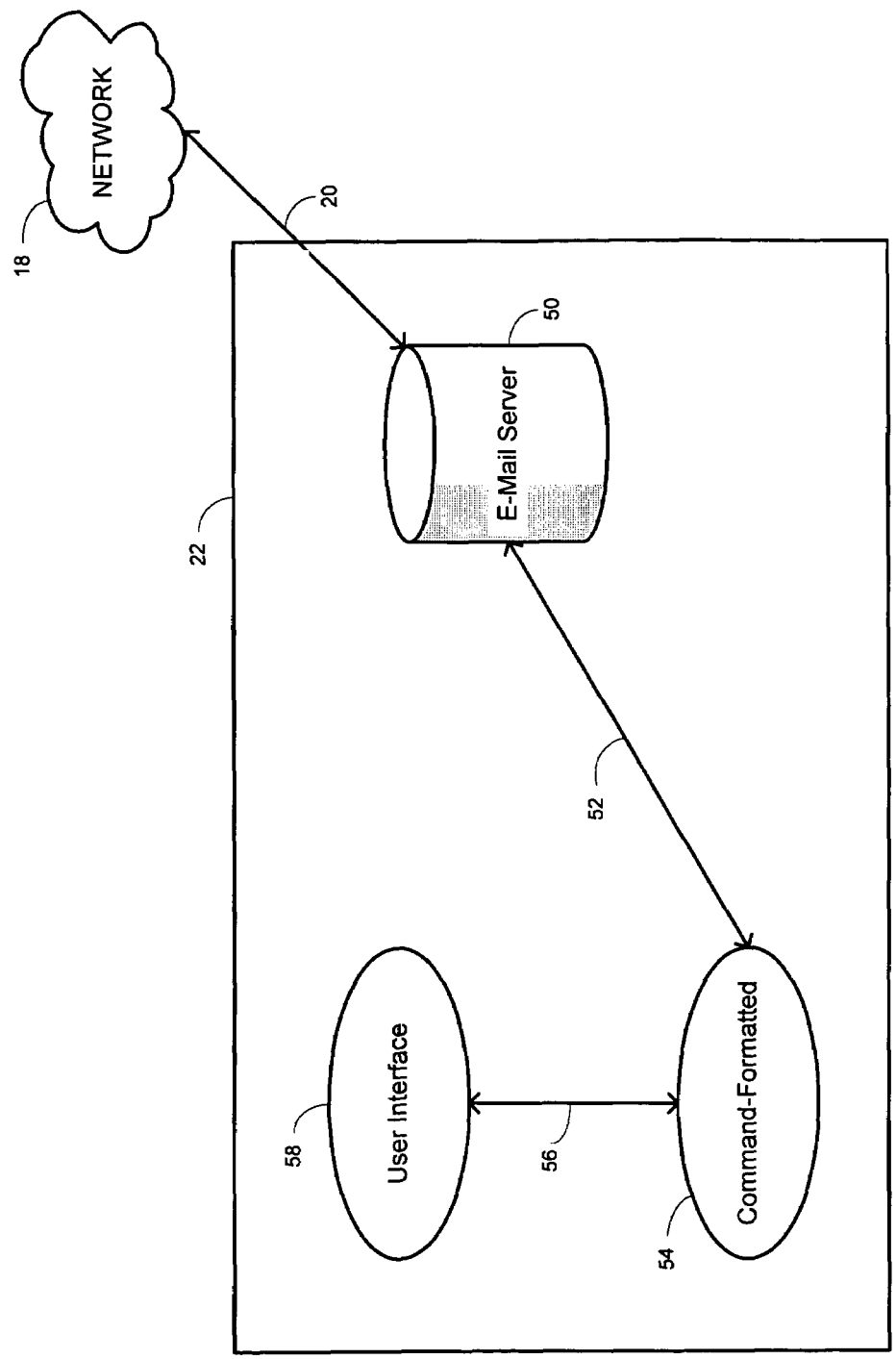
FIG. 3 illustrates the technical support center of FIG. 1 including central process software.

Referring now to FIG. 3, the technical support center 22 is shown to be coupled to the network 18 through the interface 20 according to an embodiment of the present invention. The technical support center 22 is shown to comprise the email server 50, the command-formatter 54 and the user interface 58. The email server 50 communicates with the command-formatter 54 through a software interface 52 and the command-formatter 54 communicates with the user interface 58 through a software interface 56.

The email server 50 is a device for collecting the email messages originating from the network 18 and for transmitting the email messages originating from the user interface 58 to the network 18. An example of an email server is a Personal Computer (PC). The command-formatter 54 is a software program for translating the email messages originating from the network device 14 into a format which is easily understandable by the technical staff and engineers at the user interface 58 and vice versa. While the command-formatter 54 in the embodiment of FIG. 3 is a software program, the functions performed thereby may be implemented in a hardware structure without departing from the scope and spirit of the present invention. The user interface 58 provides a graphical representation for communicating information between the technical staff and engineers and the network device 14 through the command-formatter 54, the email server 50 and the network 18.

In addition, the command-formatter 54 has the capability to format commands when the engineers decide to request the remote diagnostic embedded process 28 to perform specific tasks. For instance if the remote diagnostic embedded process 28 is asked to report the modem board status every hour, perform diagnostic test on a modem when the modem experiences three consecutive connecting failures and report peak central processing unit (CPU) loading every three hours, an email message is sent from the user interface 58 to the remote diagnostic embedded process 28 as follows:

REPORT: modem_board_status INTERVAL: 60

RUN: modem_modem_diagnostic WHEN: 3_consecutive_fail

REPORT: cpu_load INTERVAL: 180

Consequently, the command format 54 allows the engineers to communicate with the network device 14 without the need to learn a special syntax.

In one embodiment of the present invention it is not necessary to include the user interface 58 and the command-formatter 54 within the technical support center 22. In such a case, the technical support center 22 only includes the email server 50 for receiving and transmitting email messages to and from the technical support center 22. However, engineers no longer can instruct the remote diagnostic embedded process 28 to perform specific tasks in order to facilitate the diagnostic testing and remote monitoring of the network device 14. Nevertheless, it is still possible to carry out diagnostics and remote monitoring of the network device 14 using only the email server 50.

Sometimes a problem in the hardware or software components of the network device 14 which has interrupted the normal operation of the network device 14 may disappear upon rebooting of the network device. To make matters worse, the problem may not occur for some time thus making recreating the problem for diagnostic purposes difficult. The problem may have its origins in a number of sources such as the hard drive, the memory, the power supply, etc. One of the advantages of the present invention, as shown in FIG. 2, is that the remote diagnostic embedded process 28 receives information concerning the status of every software and hardware component immediately before the failure of the network device 14 either from the software health status monitor subsystem 30 or from the hardware health status monitor subsystem 32. The status information may then be used by the technical support center 22 to identify the source of the problem.

For the case when the network device 14 is a computer, an example of the status information is shown in FIG. 4. FIG. 4 shows the status of a number of hardware and software components in the computer and is referred to as a computer register. The computer register indicates the status of various components immediately before the computer failed due to a problem in one of its hardware or software components. The computer register shown in FIG. 4 includes error messages, which emanated from the faulty hardware/software component immediately before the failure of the faulty component. In FIG. 4, an error block 60 is shown to include three codes. As would be obvious to one of the engineers of a network device who would have designated such codes, the codes in the error block 60 indicate a problem within one of the subsystems of the computer. For example, a faulty board in the hard drive of the computer could have generated the codes in the error block 60. A trained engineer could identify the subsystem that has failed by viewing the codes in the error block 60.

The computer register in FIG. 4 is compiled by the hardware health status monitor subsystem 32 and transmitted to the remote diagnostic embedded process subsystem 28. After having recognized that the computer register includes an error message, the remote diagnostic embedded process 28 transmits the computer register to the technical support center 22 via the email/page subsystem 24. The engineers in the technical support center 22 detect the problem by observing the codes in the error block 60 and transmit an email message back to the remote diagnostic embedded process subsystem 28 and the subsystem 28 implements diagnostic instructions accordingly.

There are several criteria used by the remote diagnostic embedded process subsystem 28 that need to be met in order for the latter to notify the technical support center 22 of potential problems within the network device 14. One such criterion is met when an error message is detected by the remote diagnostic embedded process subsystem 28 as shown in FIG. 4. There are other criteria, besides detection of an error message, that are configurable, i.e., the technical support center 22 may alter these criteria by reconfiguring the remote diagnostic embedded process subsystem 28. Listed below are some of the criteria that need to be met before a message is forwarded to the technical support center 22.

1. Low memory (both shared or main memory)
2. High percentage of call failures on a modem or a trunk line
3. Detection of an error message
4. Detection of software reload due to software failure
5. Detection of a failed line or interface (i.e. a T1 line going down)
6. Detection of hardware problems (i.e. a board is shutdown due to a high temperature problem)
7. User defined interval (i.e. memory leak, CPU utilization, etc.)
8. Quality of an interface (i.e. high collision on Fast Ethernet)

Figure 5:
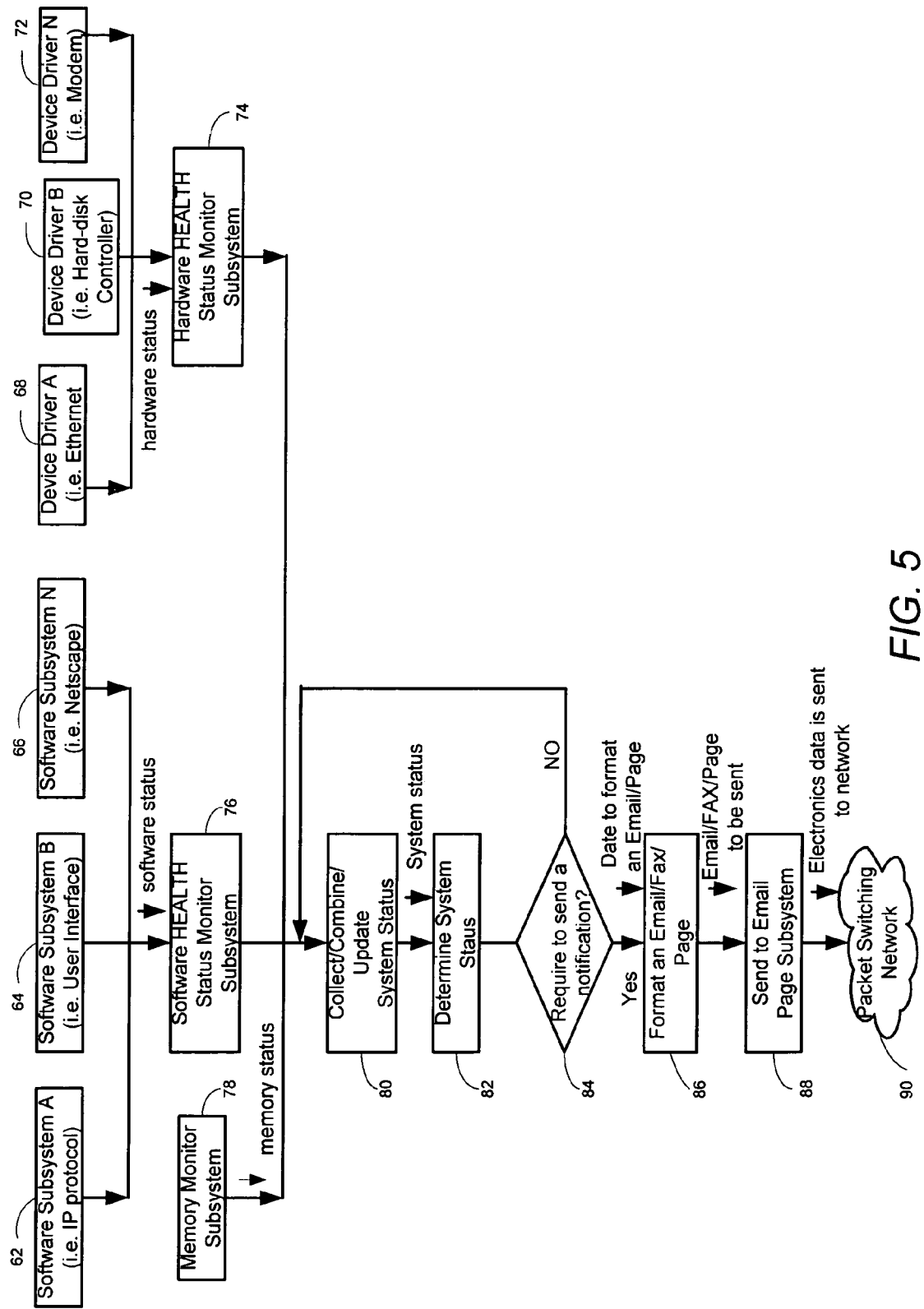
FIG. 5 shows a high-level block diagram of the sequence of steps used in sending an email from a network device to an Internet Protocol network.

FIG. 5 shows a block diagram outlining an example of the sequence of steps taken in sending an email message from the network device 14 to the network 18. In the example of FIG. 5, information regarding the status of three software subsystems is gathered by the software health status monitor subsystem at step 76. The three software subsystems are shown as software subsystem A, B through N. Examples of such software subsystems are an IP protocol, a user interface and a Netscape browser program. For instance, the software subsystem A in the example of FIG. 5 is an IP protocol, the software subsystem B is a user interface and the software subsystem N is a Netscape browser program. While three software subsystems are shown in FIG. 5, there may be more or less than three software subsystems employed. Information regarding the status of the software subsystems A, B and N is gathered at steps 62, 64 and 66, respectively, by the software health status monitor subsystem at step 76.

In FIG. 5, information regarding the status of hardware subsystems is gathered by the hardware health status monitor subsystem at step 74. The hardware subsystems are referred to as device driver A 68, device driver B 70 and device driver N 72. As in the case of software subsystems, more or less than three hardware subsystems, or device drivers, may be employed without departing from the scope and spirit of the present invention. The device drivers 68-72 may be different types of hardware structures. As an example, the device driver A 68 is shown to be an Ethernet device, the device driver B 70 is shown to be a hard disk controller device and the device driver N 72 is shown to be a modem device in FIG. 5. Next, information from the hardware health status monitor subsystem, the software health status monitor subsystem and the memory monitor subsystem, at step 78, is forwarded to the remote diagnostic embedded process subsystem where it is collected, combined and updated at step 80.

Based on the information compiled at the remote diagnostic embedded process subsystem 28, the status of the network device, (referred to, as the "system" in FIG. 5) is determined at step 82. Subsequently, at step 84, a determination is made as to whether or not the technical support center 22 should be notified regarding the status of the system. If there is no problem with the system there is no need to notify the technical support center 22 and the process of collecting information again continues from step 80. However, if there is a problem in the system as indicated, for example, by an error message in the computer register shown in FIG. 4, then a notification is transmitted, as indicated at step 86. The notification is formatted as either an email message or a fax or a page and is transmitted through the email/page subsystem at step 88 to the network 90.

Figure 6:
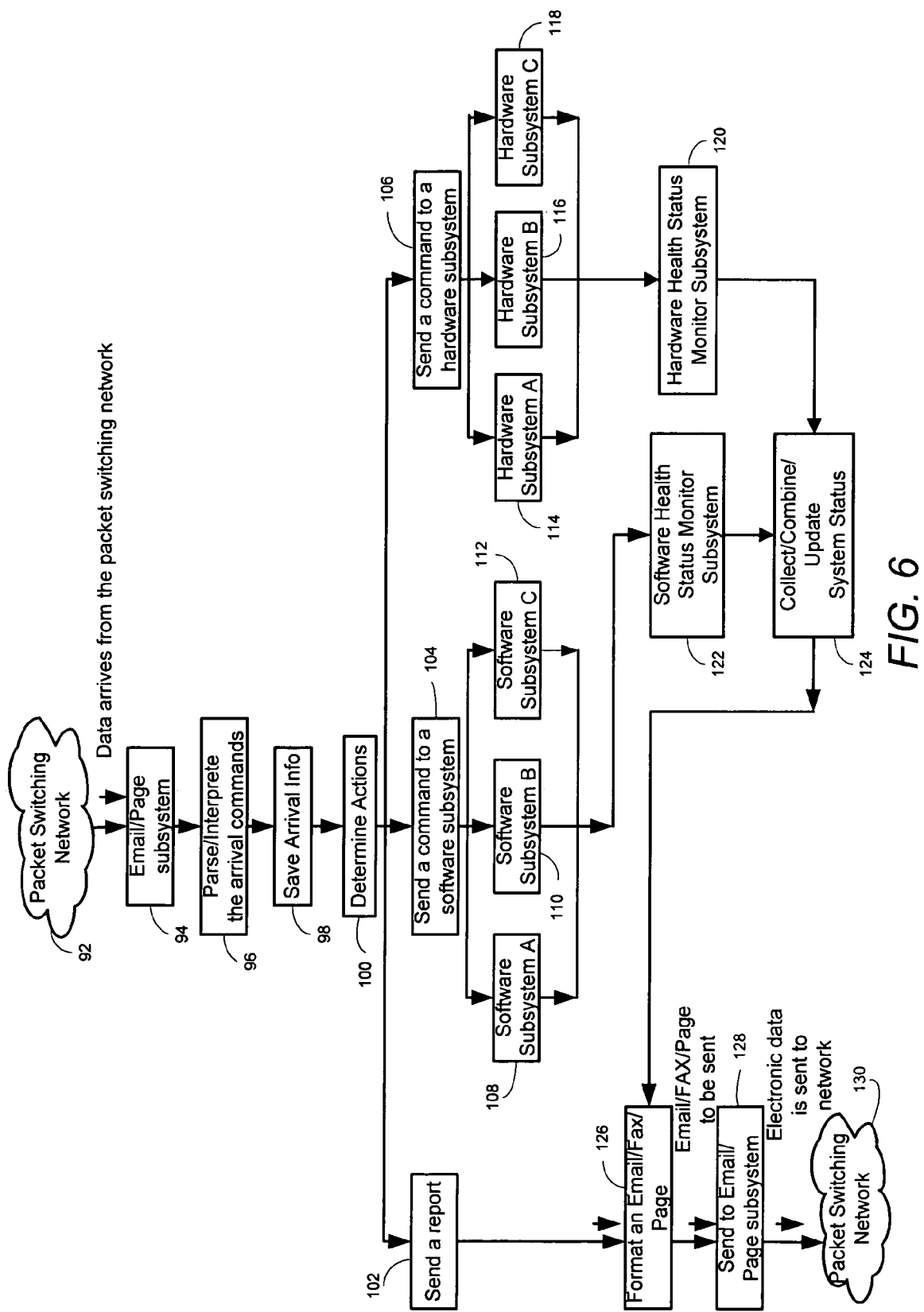
FIG. 6 shows a flow chart of the sequence of steps executed for receiving commands from the technical support center and responding thereto.

FIG. 6 shows a flow diagram of the sequence of steps taken in receiving commands from the technical support center 22 and responding thereto. Initially commands originating in the technical support center 22 are received through the packet switching network 92 by the email/page subsystem 94. The commands are then parsed and interpreted at step 96 and stored in the remote diagnostic embedded process subsystem, as shown at step 98. There are several types of actions that may be taken in response to the commands indicated at step 100. The first type of action is to prepare a report of the status of the network device and send the report back to the network as shown at step 102. Subsequently, the report is formatted as an email message, fax or a page at step 126 and sent to the email/page subsystem at step 128. The email/page subsystem then transmits the information in the report through the packet switching network 130.

The second kind of action is to send a command to a software subsystem at step 104 in order to perform diagnostic tests. The command is implemented on three software subsystems shown at steps 108, 110 and 112. The result of the diagnostic testing is compiled in the software health status monitor subsystem at step 122. The last kind of action taken by the remote diagnostic embedded software is to send a command to a hardware subsystem as indicated at step 106 for purposes of diagnostics. The command is implemented on three hardware subsystems 114, 116 and 118. The result of the diagnostic tests is compiled in the hardware health status monitor subsystem at step 120. Information regarding the status of the system as gathered by the software health status monitor subsystem and the hardware health status monitor subsystem is collected and combined together at step 124. The status information is then formatted into an email message or a fax or a page at step 126 and transmitted via the email/page subsystem at step 128 to the network 130.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A system comprising:
 a technical support center;
 a packet switching network coupled to the technical support center by a first interface line;
 at least one access server coupled to the packet switching network by a second interface line;
 where the at least one access server is configured to communicate network information to the technical support center through the packet switching network;
 where the at least one access server includes at least one hardware subsystem, at least one software subsystem, and embedded software operable to collect and analyze status information from the at least one hardware subsystem and the at least one software subsystem to detect a problem with any one of the at least one hardware and software subsystems or the second interface line;
 wherein the embedded software comprises:
  a hardware health status monitor subsystem;
  a software health status monitor subsystem; and
  a remote diagnostic embedded process subsystem for communicating with the hardware health status monitor subsystem and the software health status monitor subsystem, for collecting status information provided by the software health status monitor subsystem and the hardware health status monitor subsystem, and for detecting problems encountered by the hardware and software subsystems;
 where the status information includes error messages from any one of the at least one hardware and software subsystems or the second interface line;
 where the at least one access server is configured to send, in response to the detection of the problem, a first message to the technical center without interrupting the normal operation of the access server, the first message including the status information;
 where the least one access server is configured to page a user of the access server responsive to the detection of the problem;
 where the at least one access server is configured to respond to a second message generated by the technical support center requesting further information regarding the problem.

2. The system of claim 1, wherein the packet switching network comprises the Internet and the first message comprises an email message.

3. The system of claim 1, wherein the first message comprises a fax transmission.

4. The system of claim 1, wherein the error messages identify a particular failure for the any one of the hardware and software subsystems.

5. A network device that can be coupled to a packet switching network by an interface line to communicate with a technical support center that is also coupled to the packet switching network, the network device comprising:
- a hardware subsystem;
- a software subsystem; and
- means for monitoring the status of the hardware and software subsystems and the interface line, the network device capable of transmitting a first message to the technical support center while maintaining normal operation, the first message transmitted in response to the monitoring means detecting a problem with one of the hardware subsystem and the software subsystem, the first message transmitted prior to failure of the one of the hardware subsystem and the software subsystem, the first message notifying the technical support center of the problem and indicating the status of the hardware subsystem and the software subsystem;
- where the means for monitoring further comprising:
  - a hardware health status monitor subsystem;
  - a software health status monitor subsystem; and
  - a remote diagnostic embedded process subsystem for communicating with the hardware health status monitor subsystem and a software health status monitor subsystem, for collecting status information provided by the software health status monitor subsystem and the hardware health status monitor subsystem, and for detecting problems with the hardware and software subsystems;
- where the means for monitoring includes means for paging a user to alert the user of the problem;
- where the network device is capable of sending additional information regarding the problem to the technical support center in response to receiving a second message from the technical support center, the second message generated by the technical support center in response to the first message.

6. The network device of claim 5, wherein the network device is capable of operation without interruption while the technical support center diagnoses the problem with the one of the hardware subsystem and software subsystem.

7. The network device of claim 5, the first message transmitted in response to the remote diagnostic embedded process subsystem detecting an error message from the one of the hardware subsystem and the software subsystem.

8. A network device that can be coupled to a packet switching network by an interface line to communicate with a technical support center that is also coupled to the packet switching network, the network device comprising:
- a hardware subsystem;
- a software subsystem; and
- means for monitoring the status of the hardware and software subsystems and the interface line, the network device capable of transmitting a first message to the technical support center while maintaining normal operation, the first message transmitted in response to the monitoring means detecting a problem with one of the hardware subsystem and the software subsystem, the first message transmitted prior to failure of the one of the hardware subsystem and the software subsystem, the first message notifying the technical support center of the problem and indicating the status of the hardware subsystem and the software subsystem;
- where the means for monitoring includes:
  - a hardware health status monitor subsystem;
  - a software health status monitor subsystem; and
  - a remote diagnostic embedded process subsystem for communicating with the hardware health status monitor subsystem and a software health status monitor subsystem, for collecting status information provided by the software health status monitor subsystem and the hardware health status monitor subsystem, and for detecting problems with the hardware and software subsystems;
- where the first message is transmitted in response to the remote diagnostic embedded process subsystem detecting an error message from the one of the hardware subsystem and the software subsystem;
- where the means for monitoring includes means for detecting at least one of a memory capacity of the network device dropping below a first threshold level, a percentage of call failures to or from the network device exceeding a second threshold level, a software reload by the network device, a reduced quality of an interface on the network device, a temperature of the network device exceeding a third threshold level, and a failed interface on the network device;
- where the network device is capable of sending additional information regarding the problem to the technical support center in response to receiving a second message from the technical support center, the second message generated by the technical support center in response to the first message.

9. The system of claim 1 where the at least one access server is configured to send further information regarding the problem to the technical support center in response to the second message.

* * * * *